May 23, 1967     W. H. SIMMONS     3,321,102

CONTAINER SEAL WITH INTEGRAL MEANS FOR UNSEALING

Filed Nov. 4, 1964

INVENTOR.
WILLIAM H. SIMMONS
BY Harry M. Saragovitz,
Edward J. Kelly, Herbert Berl
& S. Dubroff
ATTORNEYS:

United States Patent Office 3,321,102
Patented May 23, 1967

3,321,102
CONTAINER SEAL WITH INTEGRAL MEANS FOR UNSEALING
William H. Simmons, 7511 Glenheath, Houston, Tex. 77017
Filed Nov. 4, 1964, Ser. No. 409,034
3 Claims. (Cl. 220—47)

The invention described herein may be manufactured and used by or for the Government for governmental purposes without the payment to me of any royalty thereon.

The invention relates to sealants and particularly to container seals with integral means for unsealing. More particularly, the invention relates to a method for sealing and unsealing structural members.

Containers such as food cans are currently opened by means of mechanical devices such as keys and mechanical can openers which cut or tear the container material. This practice, operating on the container material rather than the sealant, results in sharp-edged remnants which may be hazardous to personnel and destroys the future usefulness of the container. Further, mechanical openers wear out, require cleaning, etc., while keys are generally practicable for one time use only. In addition, both mechanical openers and keys may be lost.

Accordingly, a principal object of the present invention is to provide an improved container seal unattended by the foregoing disadvantages of the prior art.

Another object of the invention is to provide joining or sealing means with integral means for disjoining or unsealing.

Still another object of the invention is to provide an improved method of sealing or joining and unsealing or disjoining members.

Other objects of the invention will in part be obvious and in part appear hereinafter in the following description of the invention and the accompanying drawings.

In the drawings accompanying and forming a part of this specification,

Essentially, the inventive container seal comprises thermoplastic adhesive in strip or other form in combination with a heating element imbedded therein. The heating element employed may vary depending on the specific application and may comprise an electric resistance wire or a train of exothermic material such as sold under the trademark "Pyrofuze." The thermoplastic adhesive may be any suitable adhesive whose strength may be degraded in a controlled manner by heat. Where the sealant is employed in strip form any desired cross section such as circular, triangular or rectangular may be used. In certain applications sheets of adhesive with embedded foil-type heating elements are appropriate. During the assembly of the inventive sealant the heating element may, of course, be embedded in a liquid adhesive or be used in conjunction with a suitable pressure-sensitive adhesive. Use of an electric resistance wire in conjunction with a thermoplastic adhesive permits multiple resealings. The principal application of the inventive sealant lies in the attachment of a lid to a container. For example, the sealant in strip form may be wrapped around the outside of the container at the open end and its ends laid flat against the side of the container, followed by the positioning of a lid against the container and the strip. Controlled heat is then applied to the sealant, either by external means or by passing an electric current through an embedded conducting wire, softening the sealant and rendering it amenable to adherence to the lid and the container.

Unsealing of the container lid is accomplished by the application of heat to the "tag ends" of the exothermic train or conducting wire, as the case may be. In the former case the train is consumer in the resultant exothermic reaction which degrades the strength of the sealant and the lid is manually removed. The external heat source may be a match or cigarette lighter, or any other source providing a comparable amount of heat. A "button" of composition such as that used for a match head may be attached to the "tag end" of the strip and protected by a covering of pressure sensitive adhesive. To actuate the exothermic material the covering is removed and the button is rubbed against any convenient roughened surface.

Figures 1, 2:
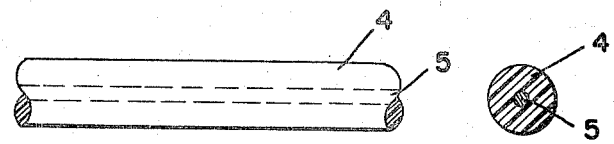
FIG. 1 depicts a side view of the sealant material.
FIG. 2 depicts a cross section of the sealant material.
Figure 3:
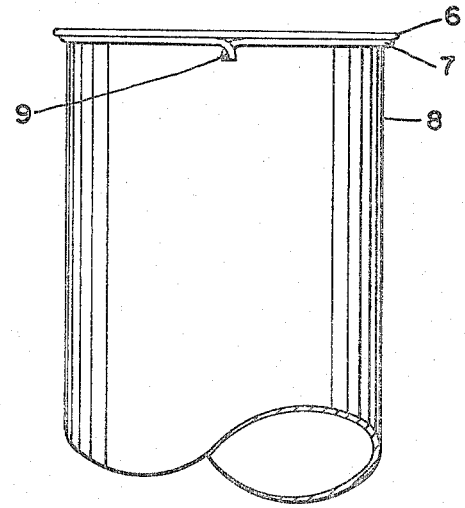
FIG. 3 depicts a container assembled with the inventive container seal.

Referring more particularly to the drawings, wherein like reference numbers indicate like parts, FIGS. 1 and 2 depict side and cross-sectional views respectively, of an illustrative piece of inventive sealant material in wire form. Exothermic train 5 is shown embedded in thermoplastic adhesive 4 giving the appearance of an insulated electric wire. FIG. 3 depicts a sealed container utilizing the sealant wire of FIGS. 1 and 2. Lid 6 is shown joined to container 8 by sealant 7 to produce an hermetic seal. Tag ends 9 of sealant 7 are shown laid flat against the side of container 8.

In the course of the investigation leading to the present invention a sealant wire of 20 centimeters length comprising a core of exothermic conducting material in wire form, 0.02 inch diameter, concentric with an outer layer of thermoplastic adhesive was placed around the outside of the open end of an ordinary food can having a 6.0 centimeter diameter. The adhesive employed was a polyamide (nylon) resin having a melting point of about 170° C., well below the ignition temperature of the exothermic conducting wire which was about 660° C. Such an adhesive is preferred because it is tough and resistant to impact, and especially attractive as a food can sealant because of its lack of toxicity. The ends of the exothermic conducting wire were connected to a source of electric current and the can lid was positioned over the open end of the can in contact with the sealant wire. A 5 ampere current was passed through the wire for 2 seconds generating over 100 gram calories of heat resulting in melting of the adhesive and causing sealing of the lid to the can. The amount of current employed was selected with a view to providing an adequate factor of safety with respect to the ignition temperature of the exothermic conducting wire. For example, the exothermic conducting wire employed requires 6.5 amperes for ignition in vacuum; ignition when surrounded by insulating materials requires higher currents because of the higher thermal conductivity of such materials. The sealing process may be completed simply by disconnecting the wire from the power source. Solidification may be made to occur rapidly upon a slight temperature drop simply by sharply designing the melting point of the adhesive. Upon completion of solidification the ends of the sealant are trimmed so that a short length of wire is exposed. A small button of match head igniter composition may be secured to the can in such position as to cover the wire ends, and a piece of pressure sensitive adhesive placed over the igniter button as a protective cover.

The process of unsealing is carried out by first manually peeling off the pressure sensitive adhesive and then rubbing the igniter button against a suitable rough surface, e.g. a rock or shoe sole. Resultant ignition of the wire causes melting or softening of the adhesive permitting manual removal of the lid.

It is to be understood that the specific embodiments set forth hereinbefore are presented for purposes of explanation and illustration and that various modifications thereof without departing from the spirit and scope of the invention may be otherwise embodied or practiced.

I claim:
1. A sealed container comprising
   a container having an open end,
   a sealant strip wrapped around the outside of said container at said open end, said strip having a core of exothermic conducting wire embedded in a thermoplastic sealant material, said material having a fuzing point lower than the ignition point of said core, and
   a lid positioned against said container at said open end and against said sealant strip,
   said lid being adhesively sealed to said container by said sealant strip.
2. A sealed container according to claim 1 wherein the ends of said sealant strip are laid flat against the side of said container in a readily accessible position.
3. A sealed container comprising
   a container having an open end,
   a sealant strip wrapped around the outside of said container at said open end, said strip being constructed of thermoplastic adhesive having a heating element of exothermic material embedded therein,
   a lid positioned against said container at said open end and against said sealant strip, said strip being adhesively sealed to said container by said sealant strip,
   said strip having tag end portion laid flat against the side of said container in a readily accessible position,
   means at said tag end portions for igniting said exothermic material and being of a friction igniting composition, and
   adhesive means covering said igniting means.

References Cited by the Examiner

UNITED STATES PATENTS 3,047,703  7/1962  Aske _____ 220—45

THERON E. CONDON, *Primary Examiner.*

G. T. HALL, *Assistant Examiner.*